(12) United States Patent
Gregg (10) Patent No.: US 6,347,019 B1
(45) Date of Patent: Feb. 12, 2002

(54) SEEK RECOVERY USING DIFFERENT SERVO PULSE DATA QUALIFICATIONS MODES

(75) Inventor: Jason D. Gregg, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/510,728

(22) Filed: Feb. 22, 2000

Related U.S. Application Data (60) Provisional application No. 60/121,101, filed on Feb. 22, 1999.

(51) Int. Cl.[7] .............................................. G11B 5/584
(52) U.S. Cl. ...................................... 360/78.04; 360/46
(58) Field of Search ........................... 360/77.08, 77.04, 360/78.04, 28, 29, 46, 78.07, 53; 369/32, 44.26, 44.28

(56) References Cited

U.S. PATENT DOCUMENTS

| | | | |
|---|---|---|---|
| 4,048,660 A | | 9/1977 | Dennison et al. |
| 4,135,217 A | | 1/1979 | Jacques et al. |
| 4,371,960 A | | 2/1983 | Kroiss |
| 4,412,165 A | * | 10/1983 | Case et al. ............ 360/77.08 X |
| 4,594,622 A | | 6/1986 | Walliss |
| 4,630,190 A | | 12/1986 | Alaimo et al. |
| 4,775,903 A | * | 10/1988 | Knowles .............. 360/77.08 X |
| 4,890,172 A | | 12/1989 | Watt et al. |
| 4,965,501 A | | 10/1990 | Hashimoto |
| 5,153,787 A | | 10/1992 | Sidman |
| 5,233,486 A | * | 8/1993 | Albert ................. 360/78.04 X |
| 5,262,907 A | | 11/1993 | Duffy et al. |
| 5,373,513 A | | 12/1994 | Howe et al. |
| 5,388,010 A | * | 2/1995 | Norton, Jr. ............ 360/77.08 X |
| 5,457,587 A | * | 10/1995 | Suzuki ................... 360/77.04 |
| 5,475,545 A | | 12/1995 | Hampshire et al. |
| 5,608,583 A | * | 3/1997 | Shrinkle .............. 360/77.08 X |
| 5,615,065 A | | 3/1997 | Cheung |
| 5,796,535 A | | 8/1998 | Tuttle et al. |
| 5,798,885 A | | 8/1998 | Saiki et al. |
| 5,801,896 A | | 9/1998 | Freitas |

FOREIGN PATENT DOCUMENTS

EP        0 427 927 A2    5/1991

* cited by examiner

Primary Examiner—David Hudspeth
Assistant Examiner—K. Wong
(74) Attorney, Agent, or Firm—Crowe & Dunlevy (57) ABSTRACT

Apparatus and method for compensating for servo data distortion in a disc drive. During a seek wherein a head is moved from an initial track to a destination track on a disc surface, servo position data are decoded on intermediary tracks by generating nominally redundant positive and negative digital pulse streams from positive and negative peaks in a servo readback signal. The positive and negative digital pulse streams are combined using a default Boolean logical operator (such as an AND operator) to qualify pulses in a first output digital pulse stream used to determine head position. When distortion arises that prevents correct detection of head position from the first output digital pulse stream, a second Boolean logical operator (such as an OR operator) is switched in to generate a second output digital pulse stream. Depending on the type of distortion, a selected one of the operators will provide improved servo data decoding.

19 Claims, 7 Drawing Sheets

SEEK RECOVERY USING DIFFERENT SERVO PULSE DATA QUALIFICATIONS MODES

RELATED APPLICATIONS

This application claims priority to U.S. Provisional Application No. 60/121,101 filed Feb. 22, 1999.

FIELD OF THE INVENTION

This invention relates generally to the field of disc drive data storage devices, and more particularly, but not by way of limitation, to improving servo performance of a disc drive through the use of different pulse stream combinations to compensate for head construction and performance variations.

BACKGROUND

Disc drives are commonly used as the primary data storage and retrieval devices in modern computer systems. In a typical disc drive, user data are magnetically stored on one or more discs that are rotated at a constant high speed and accessed by a rotary actuator assembly having a plurality of read/write heads that fly adjacent the surfaces of the discs. A read channel and interface circuit are provided to recover previously stored data from the discs to a host computer. A closed loop digital servo system provide head positional control using servo data written to the discs during manufacturing.

The servo system carries out two primary operations: seeking and track following. A seek involves moving a selected head from track to track, while track following involves causing the head to follow a particular track. It will be noted that data reading and writing operations generally occur while the disc drive is in the track following mode.

A typical seek operation uses a velocity controlled approach wherein a velocity profile, indicative of a desired velocity trajectory for the head, is selected based on the distance between an initial track and a desired, destination track. For a seek of sufficient length, the head is first accelerated to a maximum velocity, maintained at this maximum velocity until it reaches a predetermined distance from the destination track, and then decelerated to settle onto the destination track. Adjustments in the velocity of the head are repetitively made during the seek in relation to the difference between the actual velocity and the desired velocity trajectory of the velocity profile.

Since the various desired velocity values that make up the velocity profile are applied in relation to the number of tracks to go to the destination track, it is necessary for the servo system to keep track of the position of the head as the head crosses each of the intermediate tracks during the seek. This is typically carried out by tranducing the servo data to identify each track crossing as the head is moved toward the destination track. Should the servo system become unable to correctly detect the servo data, the servo system will abort the seek since closed-loop head positional control will be lost at that point.

As will be recognized, improved data transfer performance levels have been achieved in recent generations of disc drives through the introduction of magneto-resistive (MR) heads. An MR head incorporates separate write and read elements, with the write element comprising an inductive coil about a core with a write gap and the read element comprising a magneto-resistive material having a changed electrical resistance in the presence of a magnetic field of selected orientation.

The increased sensitivity of the MR element allows write pulses from the head to be relatively narrow, facilitating higher data transfer rates. However, due to the complexity and minute dimensions of MR heads, it is becoming increasingly difficult to design and manufacture heads that exhibit flawless operation. While manufacturing screening operations attempt to sort flawed heads and remove such from the manufacturing process, some heads nevertheless exhibit intermittent discrepant operation, which is usually manifested as temporary distortion in the readback signal.

Ordinarily, a distorted data readback signal may be corrected with appropriate error correction code (ECC) based techniques. However, such ECC techniques cannot be applied to the position feedback-based servo data. Thus, while MR heads have provided significant gains in data transfer performance, such heads can cause intermittent degradations in servo performance which are not easily correctable. It has been found that some MR heads exhibit a greater tendency to output distorted readback signals upon initialization, before steady-state thermal equilibrium conditions within the heads have been are achieved. Thus, distortion can often occur when the disc drive switches between a first "warm" head to a second "cool" head and immediately attempts to execute a seek operation with the second head.

Accordingly, there is a need for improvements in the art to enable disc drives to correctly decode servo data in the presence of signal distortion from an MR head. It is to such improvements that the present invention is directed.

SUMMARY OF THE INVENTION

The present invention provides an apparatus and method for improving disc drive servo control performance.

In accordance with preferred embodiments, a disc drive includes a head adjacent a rotatable disc having a surface on which a plurality of tracks are defined by servo position data. A seek is carried out to move the head from an initial track to a destination track using a velocity controlled approach wherein currents are applied to an actuator motor in relation to distance to go to the destination track.

As the head is moved toward the destination track, a servo circuit decodes servo position data stored on intermediary tracks between the initial track and the destination track by transducing an analog servo readback signal from the servo position data, the servo readback signal having successive pairs of positive and negative peaks. A positive digital pulse stream is generated with pulses indicative of positive amplitude peaks in the servo readback signal. Similarly, a negative digital pulse stream is generated with pulses indicative of negative amplitude peaks in the servo readback signal. The positive and negative digital pulse streams are thereafter combined using a first Boolean logical operator to form a first output digital pulse stream nominally indicative of position of the head.

When the servo circuit determines that first output digital pulse stream fails to correctly indicate the position of the head, typically as a result of distortion in the servo readback signal, the servo circuit selects a second Boolean logical operator to form a second output digital pulse stream from the positive and negative digital pulse streams. While different combinations of Boolean operators can be used to obtain similar results, preferably, a selected one of the Boolean logical operators is an AND operator and the remaining Boolean logical operator is an OR operator.

An AND operator typically provides improved results in the presence of spurious peaks (drop ins) in the servo readback signal caused by, for example, baseline shifts. An OR operator typically provides improved results when peaks are missing (drop outs) from the digital pulse streams, caused by, for example, asymmetry in the servo readback signal.

Preferably, separate logical mode values are stored in a table by head and updated as required during successive seeks for each head. In this way, the servo data are decoded in relation to the logical operator that has most recently been found to provide better servo performance.

These and various other features and advantages which characterize the present invention will be apparent from a reading of the following detailed description and a review of the associated drawings.

BRIEF DESCRIPTION OF THE DRAWINGS

FIG. 6 is a functional block diagram generally illustrating the manner in which the positive and negative pulse streams of FIG. 5 are alternatively combined to generate the output pulse stream of FIG. 5.

DETAILED DESCRIPTION

Figure 1:
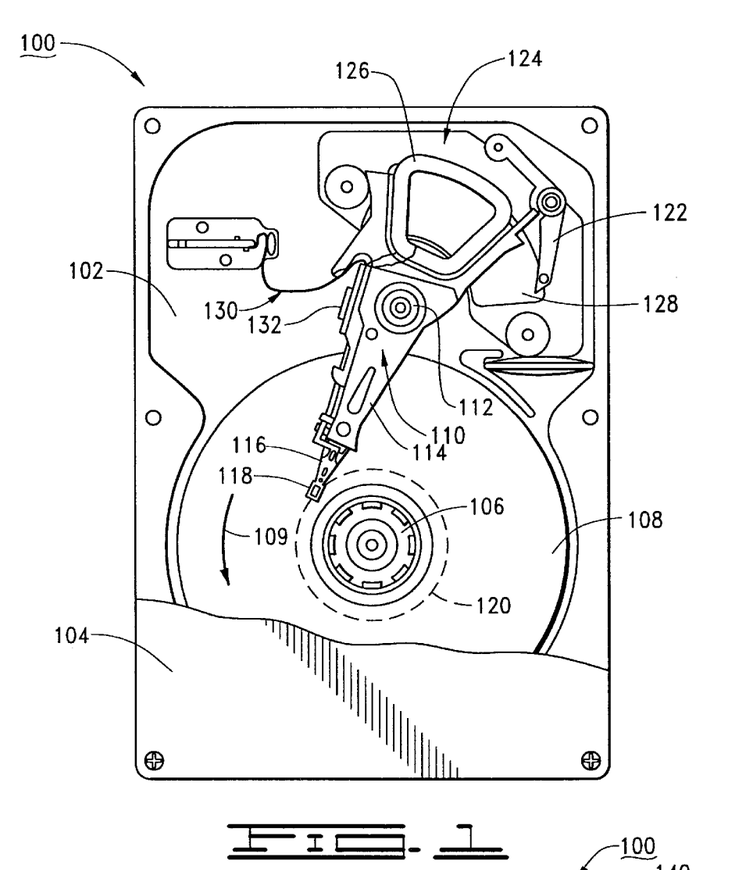
FIG. 1 is a top plan view of a disc drive constructed in accordance with preferred embodiments of the present invention.

Referring to FIG. 1, shown therein is a top plan view of a disc drive 100 of the type used to interface with a host computer to magnetically store and retrieve user data. The disc drive 100 includes a base deck 102 and a top cover 104 (shown in partial cutaway fashion) which cooperate to form a housing in which various components are mounted.

A spindle motor 106 rotates a plurality of axially-aligned, rigid, magnetic recording discs 108 at a constant high speed in an angular direction denoted by arrow 109. User data are written to and read from tracks (not designated) on the discs 108 through the use of an actuator assembly 110, which rotates about a bearing shaft assembly 112 adjacent the discs 108. The actuator assembly 110 includes a plurality of rigid actuator arms 114 which support flexible suspension assemblies 116 (flexures). Mounted at the distal end of each of the flexures 116 is a head 118 used to magnetically access the corresponding disc surface. The heads 118 are preferably characterized as magneto-resistive (MR) heads each having a thin-film inductive write element and an MR read element.

When the disc drive 100 is not in use, the heads 118 are parked on landing zones 120 and the actuator assembly 110 is secured using a magnetic latch assembly 122. The radial position of the heads 118 is controlled with a voice coil motor (VCM) 124 having a coil 126 which interacts with a magnetic circuit that includes a permanent magnet 128. A flex assembly 130 facilitates electrical communication between the actuator assembly 110 and a disc drive printed circuit board (PCB) attached to the underside of the base deck 102. The flex assembly 130 includes a preamplifier/driver circuit 132 (preamp) which applies write currents to the write elements of the heads 118 during a write operation and applies read bias currents to the MR read elements of the heads 118 during a read operation.

Figure 2:
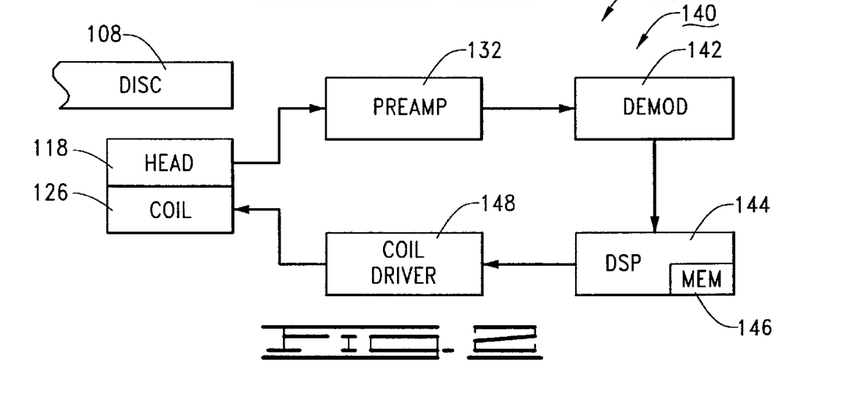
FIG. 2 is a functional block diagram of a servo circuit of the disc drive of FIG. 1.

FIG. 2 shows a functional block diagram of a servo circuit 140 of the disc drive 100 which uses servo data arranged on the discs 108 to control the position of the heads 118. The servo data are transduced by the selected head 118, preamplified by the preamp 132, and provided to a demodulation circuit 142 which conditions the servo data for processing by a servo processor 144, which preferably comprises a digital signal processor (DSP). The DSP 144 uses programming steps stored in DSP memory 146 (MEM) as well as commands issued by a top-level disc drive processor (not shown) to output current command signals to coil driver circuitry 148 which, in turn, adjusts the amount of current applied to the coil 126.

Figure 3:
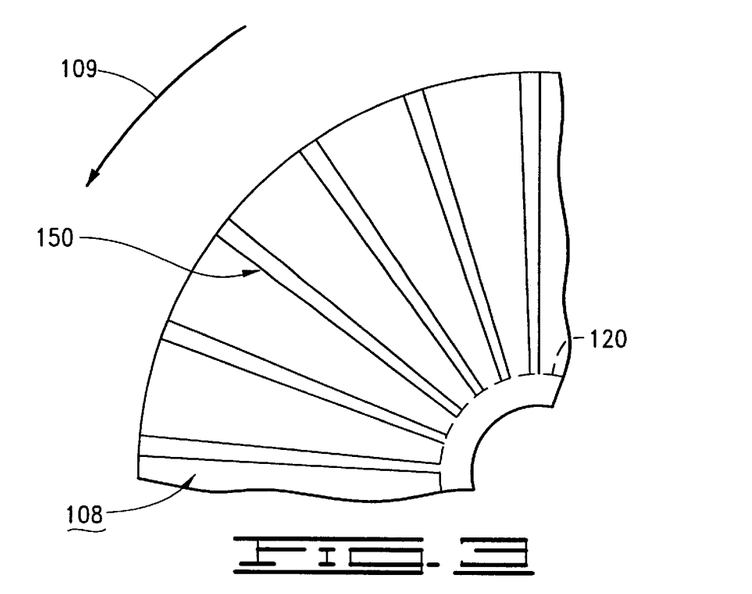
FIG. 3 illustrates the manner in which servo data are stored on each of the disc recording surfaces of the disc drive.
Figure 4:
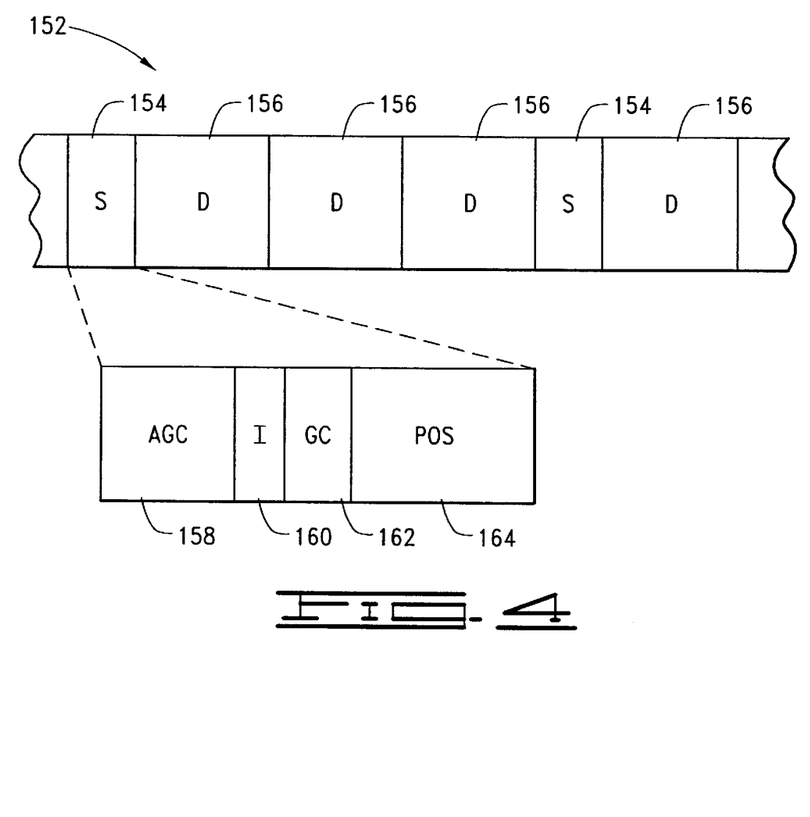
FIG. 4 is a representation of a selected servo block from FIG. 3.

The servo data are preferably arranged on the discs 108 as shown in FIGS. 3–4. FIG. 3 provides a portion of a selected one of the discs 108 with a plurality of servo wedges 150 which radially extend from the innermost to the outermost radii of the disc recording surface. The servo wedges 150 are written during disc drive manufacturing and each servo wedge comprises a plurality of radially aligned servo fields, with each servo field corresponding to a particular track on the disc surface. As will be recognized, user data are stored in the areas between adjacent servo wedges.

FIG. 4 shows a portion of a track 152 at a selected radius on the disc 108, illustrating the arrangement of respective servo fields 154 and user data fields 156. Each servo field 154 preferably includes an automatic gain control (AGC) field 158, an index field 160, a Gray code (GC) field 162 and a position (POS) field 164. The AGC field 158 provides an oscillating signal that prepares the servo circuit 140 for remaining portions of the servo field 154, the GC field 162 provides a unique track address to indicate radial position for the track, and the POS field 164 provides an arrangement of servo burst patterns that allows the servo circuit 140 to perform intra-track positioning. It will be apparent that other servo field configurations can be readily employed.

Figure 5:
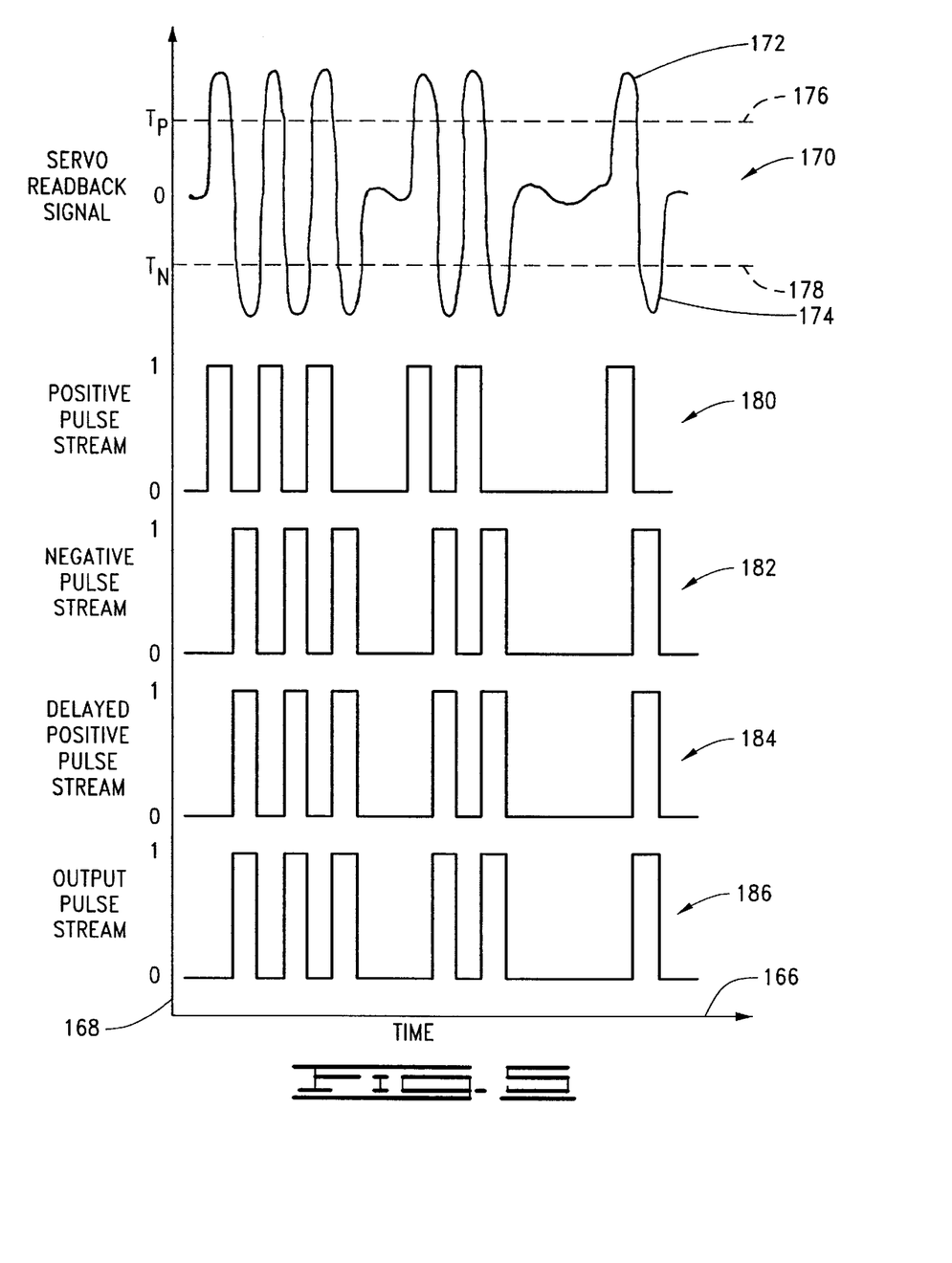
FIG. 5 provides a graphical illustration of the manner in which servo data are decoded by the servo circuit of FIG. 2.

FIG. 5 illustrates the manner in which the servo data from the servo fields 154 are decoded by the demodulator 142 of FIG. 2. A number of signal waveforms are plotted in FIG. 5 against a common x-axis 166 indicative of elapsed time and a common y-axis 168 indicative of respective signal amplitudes.

The first signal waveform in FIG. 5 is a servo readback signal 170 representative of a readback signal generated by the read element of the selected head 118 as a portion of one of the servo fields 154 passes under the head during a seek. It will be noted that the servo circuit 140 of FIG. 2 can be configured as desired to rely on all of the servo data, or only portions of the data, from the servo fields 154 to detect each track crossing as the head 118 is moved from the initial track to the destination track during the seek. Thus, for purposes of illustration it will be contemplated that the servo readback signal 170 of FIG. 5 represents the transducing of the Gray code field 162 of FIG. 4, although the present invention is not so limited.

The servo data are written as a series of di-bit pulse pairs of opposing magnetization so that, when transduced, the resulting readback signal provides a peak amplitude of one polarity immediately followed by a second peak amplitude of the opposite polarity. For a more detailed discussion of recording servo data using di-bit pulse pairs, see U.S. Pat. No. 5,801,896 issued Sep. 1, 1998 to Frietas. In the present case, the servo data are written so that each di-bit pulse pair produces a positive peak followed by a negative peak, such as denoted at peaks 172, 174 respectively, but it will be understood that the servo data could readily be written in opposite fashion.

Positive and negative peak detection thresholds 176, 178 are selected with appropriate values such as set forth by U.S. Pat. No. 6,055,121 issued Apr. 25, 2000 to Du. The thresholds 176, 178 are applied to the servo readback signal 170 to generate a positive pulse stream 180 and a negative pulse stream 182, respectively. The positive and negative pulse streams 180, 182 generally comprise digital signals with a first value (such as logical one) when the servo readback signal 170 exceeds the respective threshold 176, 178 and a second value (such as logical zero) at all other times. Because a negative pulse follows each positive pulse in the readback signal 170, the negative pulse stream 182 will nominally exhibit the same informational content as the positive pulse stream 180, but the negative pulse stream 182 will be delayed by one-half cycle (i.e., the time between successively occurring pulses).

The positive pulse stream 180 is thus preferably delayed by a corresponding amount to produce a delayed positive pulse stream 184, as shown, with the delayed positive pulse stream 184 nominally in phase with the negative pulse stream 182. The use of dual, redundant pulse streams enhances the ability of the servo system to properly decode the servo data, as discussed below. At this point, however, it will be noted that the two pulse streams 182, 184 are thereafter combined using a selected logical operator (such as an AND or OR) to produce an output pulse stream 186 having the peak detection content of the servo readback signal 170 and which, after further conditioning, is used by the DSP 144 as a positional input.

FIG. 6 provides a logical block diagram for a portion of the demodulator 142 of FIG. 2, illustrating the manner in which the output pulse stream 186 is preferably generated. It will be understood that the functional operations of FIG. 6 can be carried out in a number of ways, including through the use of hardware or firmware, as desired.

The delayed positive pulse stream 184 and the negative pulse stream 182 are routed via respective signal paths 188 and 190 to a pair of switches 192, 194. Outputs from the switches 192, 194 are routed to an AND gate 196 and an OR gate 198, respectively, the outputs of which are tied together to a common output path 200 on which the output pulse stream 186 is transmitted.

The switches 192, 194 are characterized as "normally open" type switches which close the respective connections between the input and output signal lines when a logical one is present at the respective selection (SEL) inputs. A pulse data qualification table 202 thus selects the logical operator (whether AND or OR) used to combine the signals 182, 184 by outputting a logical mode value of one to select an AND and a logical zero to select an OR (the logical zero is inverted to become a logical one by operation of inverter 204). As will be recognized, the AND logical operator will provide a pulse in the output pulse stream 186 when a corresponding pulse appears in both the negative and delayed positive pulse streams 182, 184, and the OR logical operator will provide a pulse in the output stream 186 when a corresponding pulse appears in either of the two streams 182, 184. The pulse data qualification table 202 preferably stores a different logical mode value for each head, with the contents of the pulse data qualification table 202 being supplied to the demodulator 142 by the DSP 144. The manner in which the particular logical mode values are set for each head will be discussed in detail below.

Figure 7:
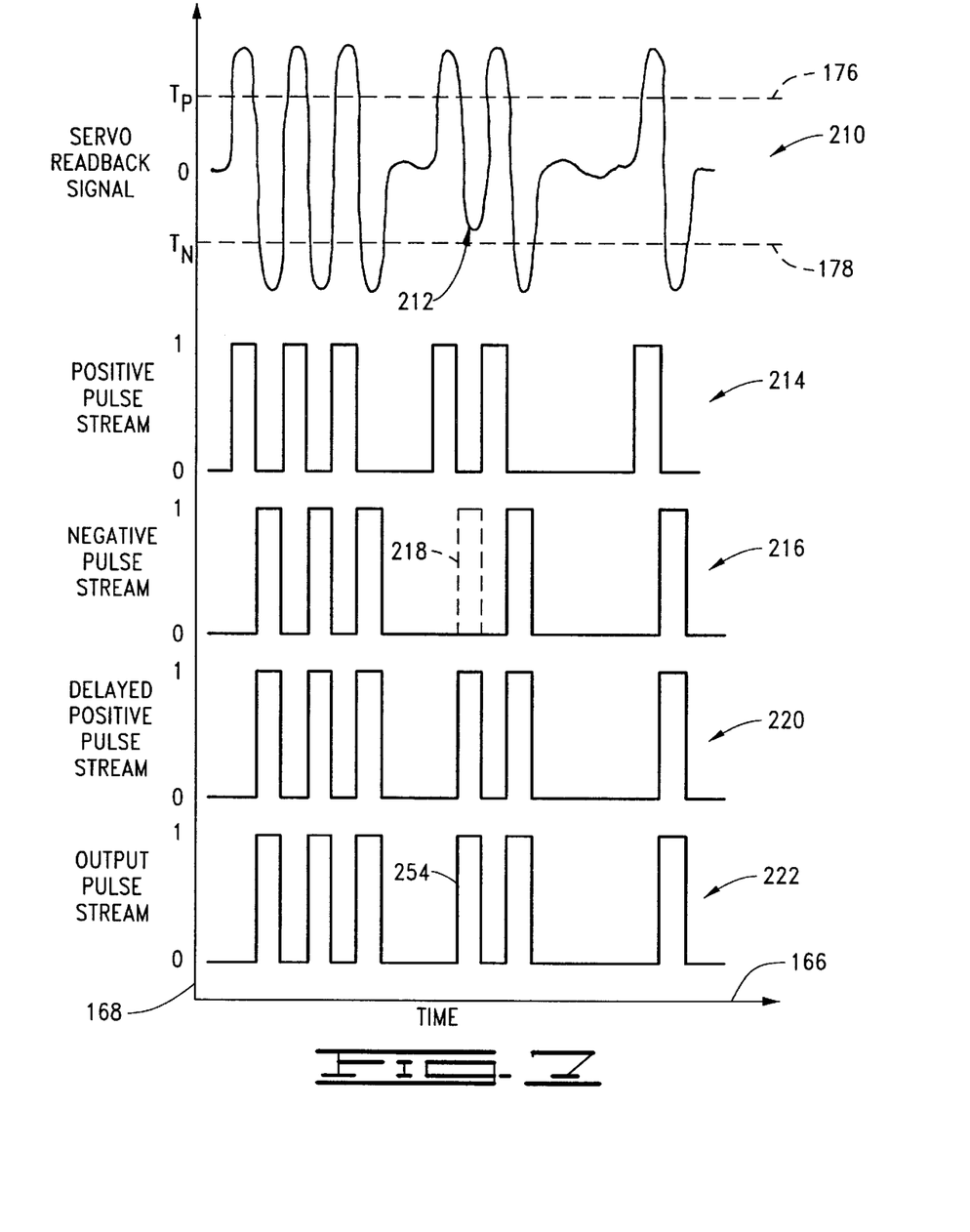
FIG. 7 provides a graphical illustration of the manner in which servo data are decoded by the servo circuit of FIG. 2 in the presence of servo readback signal asymmetry (dropouts).

At this point, however, it will be helpful to briefly discuss examples of different types of servo signal distortion that can be experienced by the disc drive 100 under various conditions. FIG. 7 illustrates the operation of the demodulator 142 in the presence of servo readback signal distortion characterized as signal peak asymmetry. More particularly, servo readback signal 210 is nominally identical to the servo readback signal 170 of FIG. 5 except that the signal 210 in FIG. 7 includes an asymmetric negative peak pulse 212, which has an amplitude that is less than than the corresponding negative peak detection threshold 178.

Hence, while a positive pulse stream 214 includes all six of the positive peaks in the servo readback signal 210, a negative pulse stream 216 only includes five of the negative peaks in the servo readback signal 210 (the missing sixth negative pulse is shown in broken line fashion at 218). The missing pulse 218 is referred to as a "drop out" in the negative pulse stream signal 216. It will be noted, that asymmetric peaks such as as 212 can be either positive or negative in amplitude.

In the example of FIG. 7, selecting a logical OR as the logical operator in FIG. 6 to combine the negative pulse stream 216 and a delayed positive pulse stream 220 will provide an output pulse stream 222 with the desired informational content.

Figure 8:
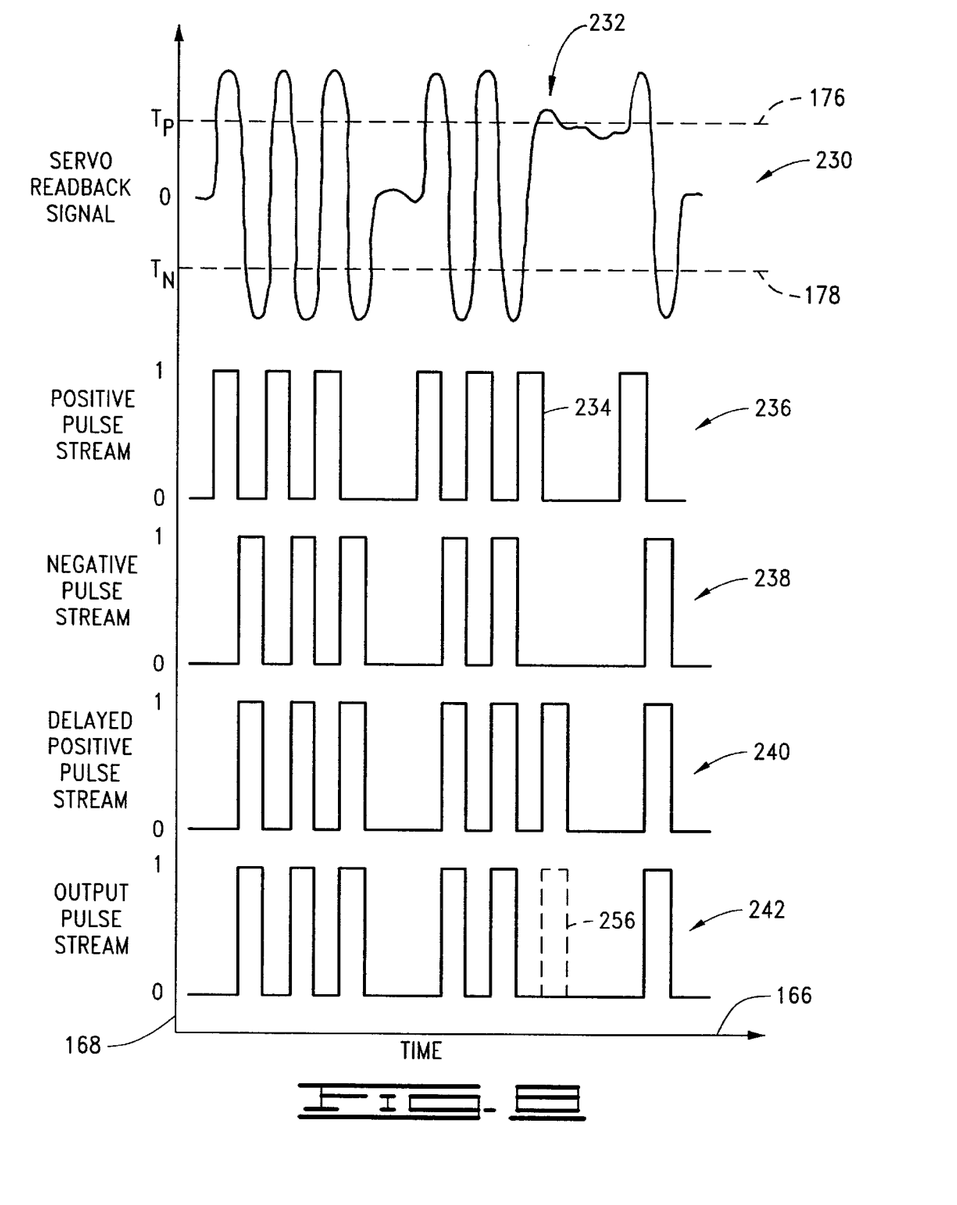
FIG. 8 provides a graphical illustration of the manner in which servo data are decoded by the servo circuit of FIG. 2 in the presence of servo readback signal baseline shift (drop ins).

FIG. 8 provides another illustration of the operation of the demodulator 142, this time in the presence of servo readback signal distortion in the form of baseline shift. Particularly, servo readback signal 230 includes a shifted baseline portion 232 which exceeds the positive threshold 176, thereby generating an additional, undesired pulse 234 in a positive pulse stream 236. This additional pulse 234 is referred to as a "drop in" in the positive pulse stream 236. A corresponding negative pulse stream 238 has the correct informational content since the baseline shift of FIG. 8 is shown to be in the positive direction. Such baseline shift, however, can can be either positive or negative.

In this case, a logical AND is the better choice to combine the negative pulse stream 238 and a delayed positive pulse stream 240, since a resulting output pulse stream 242 will not include a pulse corresponding to the baseline shifted portion 232.

Referring again to the servo circuit 140 of FIG. 2, during a seek operation for a selected one of the heads 118, the servo circuit 140 determines the address of the track being followed by the selected head (from the GC field), determines the address of the destination track, and calculates the distance therebetween in terms of tracks to go. Thereafter, the servo circuit 140 initiates a seek to move the selected head 118 from the initial track to the destination track by applying current to the coil 126 to accelerate the head 118 in the appropriate direction. During the seek, the velocity of the head is controlled with respect to position, with the servo data on intermediary tracks being detected to continually determine the position of the head 118. At a selected distance from the destination track, current is applied to the coil 126 of opposite polarity to decelerate the head 118 to come to rest over the destination track in accordance with a deceleration profile which defines the desired deceleration velocity trajectory for the head 118. It will be understood that during the detection of the servo data from intermediary tracks, the negative and delayed positive pulse streams (such as 182, 184 in FIG. 5) are combined in accordance with the preselected logical operator (i.e., either AND or OR) for the selected head, as provided by the pulse data qualification table 202.

Should the readback signal from the selected head 118 become distorted, however (such as illustrated in FIGS. 7 and 8), the servo circuit 140 will generally be unable to determine with certainty the position of the head during the seek. In the prior art, typically the only way to resolve such a situation has been to abort and retry the seek a successive number of times until the problem is resolved, or a seek error is declared to the host.

Figure 9:
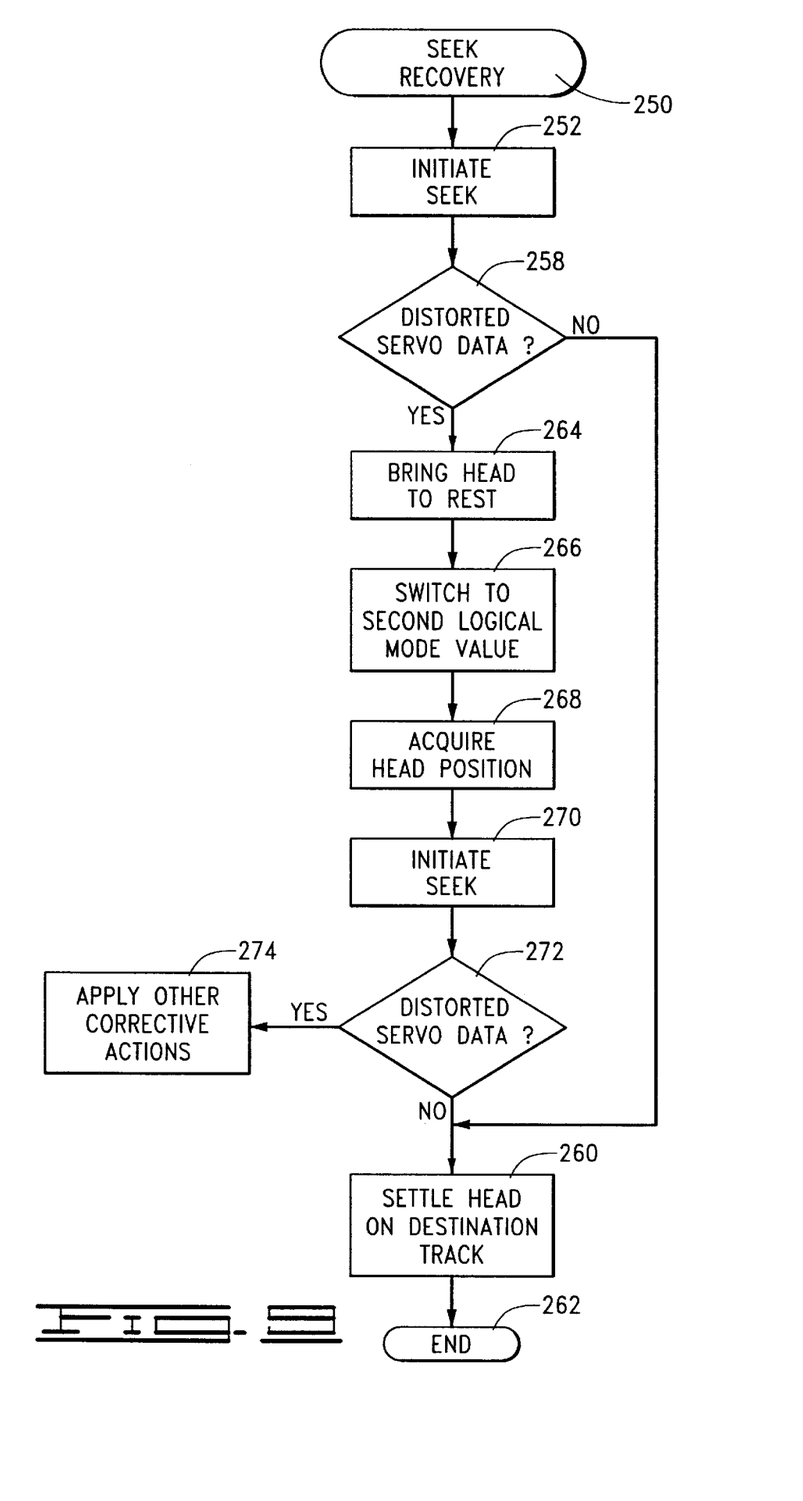
FIG. 9 is a flow chart for a SEEK RECOVERY routine, illustrative of steps carried out in accordance with preferred embodiments of the present invention.

The present invention, however, as embodied herein and claimed below, provides an improved approach to recovering from intermittent position data readback signal distortion during a seek. FIG. 9 provides a SEEK RECOVERY routine 250, illustrative of steps carried out in accordance with preferred embodiments of the present invention. It will be understood that the flow of FIG. 9 preferably represents programming stored in DSP memory 146 and utilized by the DSP 144 during a seek.

At step 252, the servo circuit 140 initiates a seek with a selected head 118 to a destination track, generally in accordance with the foregoing discussion. Thus, step 252 includes the periodic generation of servo readback signals (such as the signal 170 of FIG. 5) from the servo fields 154 on the intermediary tracks between the initial and destination tracks. Step 252 further includes the generation of positive and negative pulse streams (such as 182, 184 of FIG. 5) from the readback signals and the use of the then-existing logical mode value ("first" value) from the table 202 to combine the streams to generate the output pulse stream (such as 186) for use by the DSP 144.

As long as the servo readback signals are well behaved (nondistorted) such as the signal 170 in FIG. 5, the particular operator (whether AND or OR) used as the first logical mode value will not have much effect, if any, upon the characteristics of the output pulse stream 186. That is, for a nondistorted readback signal, both an AND and an OR operator will generally result in the same output pulse stream 186 (excepting minor edge timing variations), and the output pulse stream 186 will not be distorted, i.e., it will not include missing pulses (dropouts) or additional, undesired pulses (drop ins).

However, should distortions arise in the servo readback signal, the first logical mode value from the table 202 may or may not be able to adequately qualify the pulses in the output pulse stream during the seek. For example, with reference again to FIG. 7, an asymmetric pulse such as 212 in the servo readback signal will still result in a correct informational content in the output pulse stream 186 if an OR logical mode value is used, but an AND logical mode value would result in a missing pulse; that is, pulse 254 would not appear in the output pulse stream 222. Likewise, with reference to FIG. 8, the baseline shifted portion 232 in the servo readback signal 230 results in the extra pulse 234 in the positive pulse stream 236. This extra pulse 236 does not appear in the output pulse stream 242 using an AND logical mode value. Using an OR logical mode value, however, would undesirably provide an additional pulse 256 (shown in broken line fashion) in the output pulse stream 242.

Accordingly, decision step 258 determines whether distortion is present in the output pulse stream (such as in the form of a missing pulse or an extra, unexpected pulse) sufficient to prevent the servo circuit 140 from properly determining the position of the head 118 during the seek. See, for example, U.S. Pat. No. 5,801,896, which teaches the decoding of a servo seek mode tracking signal. If no such distortion occurs during the seek, the servo circuit 140 will be able to properly determine the position of the head during the entirety of the seek until the head 118 reaches the destination track. In such case the flow passes to step 260 wherein the head 118 is settled onto the destination track, after which the disc drive 100 proceeds to carry out the desired data transfer operation thereon (and the routine ends at 262).

The foregoing sequence represents the typical operation of the disc drive 100, as servo data distortion is contemplated as generally occurring only on an intermittent and infrequent basis. If the distortion is related to temperature, it is contemplated that the distortion may have a greater probability of arising when the head 118 is initially selected; that is, prior to the seek operation of step 252, a different head 118 adjacent a different data recording surface was biased by the preamplifier and a head switch operation was carried out to switch from this prior head to the selected head.

On the other hand, when servo data distortion does arise during the seek sufficient to prevent the servo circuit 140 from decoding the servo data, the routine passes from decision step 258 to step 264 at which point the head is immediately brought to rest. This is preferably carried out by applying a temporary electrical short across the actuator coil 126. The purpose of bringing the head 118 to rest is precautionary in nature; once the position of the head 118 becomes unknown, continuing to allow the actuator 110 to move could potentially result in the inadvertent slamming of the actuator against an inner or outer limit stop at a terminal velocity sufficient to damage the heads 118.

Once the head 118 is brought to rest, the servo circuit 140 switches to a different, "second" logical mode value for the head 118 at step 266. If AND was previously used, step 266 changes this to OR, and vice-versa. The DSP 144 preferably writes the updated logical mode value to the table 202 so that the updated value is provided to the demodulator 142 for subsequent use.

After the second logical mode value has been selected, the flow continues to step 268 where the position of the head 118 is acquired by transducing the servo data from the associated track to which the head 118 has come to rest. The routine then passes to step 270 wherein a seek is again initiated to the destination track, this time using the second logical mode value selected in step 266. It is contemplated that, in most cases, the toggling of the logical mode value will enable the servo circuit 140 to correctly decode the servo data and complete the seek. However, for purposes of completeness decision step 272 has been included to show an inquiry whether distorted servo data again arises during the seek using the second logical mode value; if so, the routine passes to step 274 wherein other corrective actions are applied by the disc drive 100 (such as adjustments in gain and threshold values, etc.).

Preferably, the contents of the pulse data qualification table 202 are initially set and thereafter adjusted on a head-by-head basis during respective seeks arrive at optimum values based on which modes provide better servo performance. Although the logical mode values of the table 202 have been described in terms of seeking, it will be understood that all servo data demodulation operations for a particular head are carried out using the particular mode identified in the table 202. Finally, depending upon the requirements of a given application, the logical mode values can further be assigned on a per-head, per-zone basis, so that different logical mode values are utilized by the same head at different radii on the disc.

In summary, it will now be recognized that the present invention is directed to an apparatus and method for compensating for servo data distortion during a disc drive seek. In accordance with preferred embodiments, a disc drive 100 includes a head 118 adjacent a rotatable disc 108 having a surface on which a plurality of tracks are defined by servo position data 154. A seek is carried out to move the head from an initial track to a destination track using a velocity controlled approach wherein currents are applied to an actuator motor 124 in relation to distance to go to the destination track.

As the head is moved toward the destination track, a servo circuit 140 decodes servo position data stored on intermediary tracks between the initial track and the destination track by transducing an analog servo readback signal 170, 210, 230 from the servo position data, the servo readback signal having successive pairs of positive and negative peaks. A positive digital pulse stream 180, 214, 236 is generated with pulses indicative of positive amplitude peaks in the servo readback signal. Similarly, a negative digital pulse stream 182, 216, 238 is generated with pulses indicative of negative amplitude peaks in the servo readback signal. The positive and negative digital pulse streams are thereafter combined using a first Boolean logical operator to form a first output digital pulse stream nominally indicative of position of the head.

When the servo circuit determines that first output digital pulse stream fails to correctly indicate the position of the head, which can occur as a result of distortion in the servo readback signal, the servo circuit selects a second Boolean logical operator to form a second output digital pulse stream from the positive and negative digital pulse streams. Preferably, a selected one of the Boolean logical operators is an AND operator and the remaining Boolean logical operator is an OR operator. An AND operator typically provides improved results in the presence of spurious peaks (drop ins) in the servo readback signal caused by, for example, baseline shifts. An OR operator typically provides improved results when peaks are missing (drop outs) from the digital pulse streams, caused by, for example, asymmetry in the servo readback signal.

As used herein, the function of "moving the head from an initial track to a destination track on the disc surface" will be understood as being carried out by the disclosed servo circuit 140 including demodulator 142 configured as shown in FIG. 6 and processor 144 programmed to operate in accordance with the flow of FIG. 9. Structures that do not (a) combine positive and negative pulse streams in accordance with a first Boolean logical operator to form a first output pulse stream, (b) determine that the first output pulse stream fails to correctly identify head position, and then (c) as a result switch to a second, different Boolean logical operator to combine the positive and negative pulse streams to form a second output pulse stream are expressly excluded from the definition of an equivalent structure.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention and as defined in the appended claims.

What is claimed is:

1. In a disc drive having an actuator which positions a head adjacent a plurality of tracks on a rotatable disc surface, a method for carrying out a seek operation wherein the head is moved from an initial track to a destination track, comprising steps of:

(a) accelerating the head in a direction toward the destination track;

(b) decoding servo position data stored on intermediary tracks between the initial track and the destination track by transducing an analog servo readback signal from the servo position data, generating a positive digital pulse stream with pulses indicative of positive amplitude peaks in the servo readback signal, generating a negative digital pulse stream with pulses indicative of negative amplitude peaks in the servo readback signal, and combining the positive and negative digital pulse streams to form a first output digital pulse stream in accordance with a first Boolean logical operator, the first output digital pulse stream nominally indicative of position of the head;

(c) determining that the first output digital pulse stream fails to correctly indicate the position of the head; and (d) combining the positive and digital pulse streams to form a second output digital pulse stream in accordance with a second Boolean logical operator, the second output digital pulse stream nominally indicative of the position of the head.

2. The method of claim 1, wherein a selected one of the first and second Boolean logical operators comprises a logical AND operator and the remaining one of the first and second Boolean logical operators comprises a logical OR operator.

3. The method of claim 1, further comprising a step of (e) decelerating the head to bring the head to rest at a position between the initial and destination tracks before the operation of step (d).

4. The method of claim 3, wherein step (e) comprises applying an electrical short across an actuator coil used to move the head across the disc surface.

5. The method of claim 1, wherein step (b) further comprises steps of applying respective positive and negative peak detection thresholds to the servo readback signal so that the pulses in the positive digital pulse stream have widths corresponding to portions of the servo readback signal above the positive peak detection threshold, and so that the pulses in the negative digital pulse stream have widths corresponding to portions of the servo readback signal below the negative peak detection threshold.

6. The method of claim 1, further comprising a step of (e) storing a logical mode value indicative of the first logical operator in a memory location, wherein the memory location is subsequently updated with a new logical mode value indicative of the second logical operator.

7. The method of claim 1, wherein step (b) further comprises a step of delaying at least one of the positive and negative digital pulse streams to bring the respective pulses of the positive and negative digital pulse streams into nominal phase alignment.

8. In a disc drive having a rotatable data recording surface with a plurality of tracks which are accessed by a read/write head supported by a moveable actuator, a method for carrying out a seek wherein the head is moved from an initial track to a destination track, comprising steps of:

(a) generating an analog servo readback signal having successively occurring pairs of positive and negative peaks from servo position data transduced as the head is moved across the data recording surface;

(b) applying respective positive and negative peak detection thresholds to the servo readback signal to generate respective positive and negative digital pulse streams;

(c) generating a first output digital pulse stream nominally indicative of head position as a logical combination of the positive and negative digital pulse streams using a first Boolean logical operator;

(d) detecting presence of distortion in the servo readback signal which prevents the first output digital pulse stream from correctly indicating the position of the head;

(e) selecting a second Boolean logical operator;

(f) generating a second analog servo readback signal having successively occurring pairs of positive and negative peaks from servo position data transduced as the head is moved between the initial track and the destination track;

(g) applying respective positive and negative peak detection thresholds to the second servo readback signal to generate respective second positive and negative digital pulse streams;

(h) combining the respective second positive and negative digital pulse streams using the second Boolean logical operator to generate a second output digital pulse stream nominally indicative of head position.

9. The method of claim 8, further comprising a step of:

(I) using the second output digital pulse stream to position the head onto the destination track.

10. The method of claim 8, wherein a selected one of the first and second Boolean logical operators comprises a logical AND operator and the remaining one of the first and second Boolean logical operators comprises a logical OR operator.

11. The method of claim 8, further comprising a step of (I) decelerating the head to bring the head to rest at a position between the initial and destination tracks after the operation of step (d).

12. The method of claim 8, further comprising a prior step of storing a logical mode value indicative of the first logical operator in a memory location, wherein the memory location is subsequently updated with a new logical mode value indicative of the second logical operator.

13. The method of claim 8, wherein step (b) further comprises a step of delaying a selected one of the positive and negative digital pulse streams to bring respective pulses of the positive and negative digital pulse streams into nominal phase alignment.

14. A disc drive, comprising:

a rotatable data recording surface on which a plurality of tracks are defined by servo position data;

an actuator which supports a head adjacent the data recording surface;

an actuator motor configured to move the actuator; and a servo circuit which carries out a seek to move the head from an initial track to a destination track on the data recording surface by applying current to the actuator motor while detecting head position by transducing an analog servo readback signal from the servo position data, generating a positive digital pulse stream with pulses indicative of positive amplitude peaks in the servo readback signal, generating a negative digital pulse stream with pulses indicative of negative amplitude peaks in the servo readback signal, and combining the positive and negative digital pulse streams to form a first output digital pulse stream in accordance with a first Boolean logical operator, wherein the servo circuit switches to a second Boolean logical operator to form a second output digital data pulse stream when the first output digital pulse stream fails to correctly indicate the position of the head.

15. The disc drive of claim 14, wherein a selected one of the first and second Boolean logical operators comprises a logical AND operator and the remaining one of the first and second Boolean logical operators comprises a logical OR operator.

16. The disc drive of claim 14, wherein the servo circuit further applies current to the actuator motor to bring the head to rest at a position between the initial and destination tracks after determining that the first output digital pulse stream fails to correctly indicate the position of the head.

17. The disc drive of claim 14, wherein the servo circuit stores a logical mode value indicative of the first logical operator in a memory location, and wherein the memory location is subsequently updated with a new logical mode value indicative of the second logical operator.

18. The disc drive of claim 14, wherein the servo circuit further delays a selected one of the positive and negative digital pulse streams to bring respective pulses of the positive and negative digital pulse streams into nominal phase alignment.

19. A disc drive, comprising:

a head adjacent to a rotatable disc surface on which a plurality of tracks are defined; and movement means for moving the head from an initial track to a destination track on the disc surface.

* * * * *